United States Patent
Suzuki et al.

(10) Patent No.: US 10,222,248 B2
(45) Date of Patent: Mar. 5, 2019

(54) PLATINUM TEMPERATURE SENSOR ELEMENT

(71) Applicant: KOA Corporation, Nagano (JP)

(72) Inventors: Ryusuke Suzuki, Tokyo (JP); Hideki Fujiwara, Tokyo (JP); Tatsuya Kawahara, Tokyo (JP)

(73) Assignee: KOA CORPORATION, Nagano (JP)

( * ) Notice: Subject to any disclaimer, the term of this patent is extended or adjusted under 35 U.S.C. 154(b) by 0 days.

(21) Appl. No.: 15/784,724

(22) Filed: Oct. 16, 2017

(65) Prior Publication Data
US 2018/0106651 A1    Apr. 19, 2018

(30) Foreign Application Priority Data
Oct. 17, 2016  (JP) ................. 2016-203847

(51) Int. Cl.
*H01C 7/02*   (2006.01)
*G01F 1/692*  (2006.01)
*G01F 1/698*  (2006.01)
*H05B 3/20*   (2006.01)
*G01K 7/18*   (2006.01)

(52) U.S. Cl.
CPC .............. *G01F 1/692* (2013.01); *G01F 1/698* (2013.01); *G01K 7/18* (2013.01); *G01K 7/183* (2013.01); *H01C 7/021* (2013.01); *H05B 3/20* (2013.01)

(58) Field of Classification Search
CPC ......... H01C 7/021; G01F 1/692; G01F 1/698; G01K 7/183
See application file for complete search history.

(56) References Cited

U.S. PATENT DOCUMENTS

| 4,213,113 | A  | * | 7/1980 | Brandt ...................... H01C 1/14 338/165 |
| 5,735,606 | A  | * | 4/1998 | Tani ....................... G01F 1/6845 338/25 |
| 6,437,681 | B1 | * | 8/2002 | Wang ...................... G01K 7/183 338/25 |
| 6,543,102 | B1 | * | 4/2003 | Zitzmann .............. G01F 1/6845 29/612 |
| 7,339,455 | B2 | * | 3/2008 | Fujita ....................... G01K 7/18 338/25 |

(Continued)

FOREIGN PATENT DOCUMENTS

| JP | 03268302    | 11/1991 |
| JP | 06061012    | 3/1994  |
| JP | 2015532438 A | 11/2015 |

*Primary Examiner* — Kyung S Lee
(74) *Attorney, Agent, or Firm* — Edell, Shapiro & Finnan, LLC

(57) ABSTRACT

Internal electrodes, a protective film, and protective films covering the top parts of internal electrode sides of lead wires are formed on a top surface of a substrate of a temperature sensor element, thereby making the overall shape a quadrangular prism and the transverse cross-section nearly a square even at any portion in the axial direction. A heating part of the temperature sensor element is provided near the center along the length, the height, and the width of the element, thereby preventing deviation of heat generation and stabilizing heat release to the lead wires. This allows the temperature sensor element to suppress fluctuation in detected temperatures due to mounting angle.

5 Claims, 8 Drawing Sheets

(56) References Cited

U.S. PATENT DOCUMENTS

| | | | |
|---|---|---|---|
| 7,746,212 B2* | 6/2010 | Zitzmann | G01K 7/186 338/22 R |
| 8,138,881 B2* | 3/2012 | Zinkevich | G01K 7/183 338/22 R |
| 8,183,974 B2* | 5/2012 | Wienand | G01K 1/10 338/25 |
| 8,730,002 B2* | 5/2014 | Wienand | G01K 7/183 338/13 |

* cited by examiner

PLATINUM TEMPERATURE SENSOR ELEMENT

TECHNICAL FIELD

The present invention relates to a platinum temperature sensor element used in an air-flow sensor for measuring air intake passing through an air inlet pipe, for example.

BACKGROUND

Control for measuring air intake for internal combustion engines such as gasoline engines using an air-flow sensor provided within an air inlet pipe, and for injecting fuel in accordance with the quantity of air drawn in by the engine is carried out. Conventionally, a platinum element has been used as the air-flow sensor to measure air intake to an engine in this manner accurately. Most recently, air-flow sensors are essential for air-flow control in air conditioning equipment, and control of wind speed and air flow etc. in environmental equipment.

There are two types of air-flow sensors: a hot type (also called a hot wire type) that utilizes change in resistance of a heated wire as a result of current flowing through a platinum element (platinum hot wire) so as to increase the temperature through self-heating, and losing heat as the air hits its heating portion; and a cold type that measures air temperature as is. Since either type of sensor needs to be placed within an air flow and to measure the temperature of the air accurately, it is necessary to control fluctuation in element resistance, fluctuation in TCR (temperature coefficient of resistance), fluctuation in how heat dissipates, and fluctuation due to turbulence of air flow around the element, etc.

While platinum that has stable properties and excellent resistance-temperature characteristics has been used as a temperature-sensitive material for the element, reduction in element size and heat capacity is necessary in order to quickly respond to change in input (temperature change). In particular, since the hot type element mentioned above utilizes change in resistance, there is a pressing demand against fluctuation in characteristics leading directly to error of measurement.

On the other hand, there are two types of temperature sensors broadly when classified according to configuration: a planar element and a winding-type axial round bar element. Patent Document 1, for example, discloses a winding-type element, such as a resistor element having a platinum wire as a resistor that is wound around a peripheral surface of a ceramic pipe and utilizing temperature dependency on resistance of the resistor.

Patent Document 2, for example, discloses a planar element, such as a thin-film thermistor formed by layering a first thermosensitive film and a second thermosensitive film made of a compound oxide, etc. on a ceramic substrate and providing an insulating layer between the ceramic substrate and the first thermosensitive film, thereby preventing degradation of thermal responsiveness and resistance-temperature characteristics. Moreover, Patent Document 3 discloses a temperature sensor where a substrate and a resistance-meandering part are covered by an intermediate layer (insulating layer) so as to stably hold the resistance-meandering part even if the temperature changes rapidly.

Patent Documents (as referenced herein):
Patent Document 1: JP H3-268302A
Patent Document 2: JP H6-61012A
Patent Document 3: JP 2015-532438A

SUMMARY OF THE INVENTION

The winding-type sensor element described above has a problem that the winding pitch is difficult to stabilize and that such instability of coils causes fluctuation in resistance. On the other hand, in the case of a planar sensor element, if a heat-generating point diverges from the vicinity of the center of the sensor due to the position of a pattern on the substrate, for example, there is a problem that heat release to wires (lead wires) varies, thereby preventing proper temperature output. As a result, troublesome adjustment of the sensor for temperature correction becomes necessary.

Moreover, the conventional planar sensor is not assumed to be used as an air-flow sensor element, and it tends to be manufactured having a large external size. Further, even if it is downsized, the projected area of the element within an air current will vary greatly depending on angle and direction when installed due to the cross-sectional shape of the sensor element. Therefore, there are problems that the air current around the element fluctuates greatly, and fluctuation in detected temperatures easily occurs depending on an installation state of the element.

The present invention is devised in light of these problems, and aims to provide a temperature sensor element capable of suppressing fluctuation in detected temperatures due to mounting angle, etc.

The present invention achieves the above objective, and the configuration below, for example, is merely an exemplary means for resolving the above problems. Namely, a platinum temperature sensor element is characterized by including: an insulating substrate having a planar rectangular shape made of an insulating material with a predetermined thickness; a pattern made of a platinum resistance film formed on the insulating material; a pair of electrodes formed on either end along the length of the insulating substrate; lead wires that are joined to the respective paired electrodes and extend to the outside; and a protective film that is formed on a top side of the insulating substrate to cover the pattern, the paired electrodes, and top surfaces of joined regions of the lead wires to the paired electrodes; wherein the platinum temperature sensor element has an overall shape of square column, and a transverse cross-sectional shape at the center along the length is quadrilateral where a ratio of length and breadth is 1:1 to 1.5; and wherein at the center along the length, thickness of the insulating substrate and thickness of the protective film are approximately equal.

For example, it is characterized in that the center of the pattern is a heating part, and the heating part is positioned not only at nearly the center along the length of the insulating substrate but also at nearly the center along the height and the width of the platinum temperature sensor element. For example, the heating part is characterized by being made of a meander-shaped pattern. Moreover, for example, it is characterized in that thickness of the protective film on top of the joined regions is 130 to 180 μm. Furthermore, for example, it is characterized in that a ratio of width of the insulating substrate to height of the platinum temperature sensor element is 1:1 to 1.5, a ratio of width of the insulating substrate to diameter of the lead wires is 2.5:1 to 3:1, and a ratio of respective length of the paired electrodes to length of the insulating substrate is 1:4 to 1.5.

According to the platinum temperature sensor element of the present invention, fluctuation in resistance due to turbulence of air flow around the element can be prevented, and air intake etc. can be accurately detected as an air-flow sensor.

DETAILED DESCRIPTION

Figure 1:
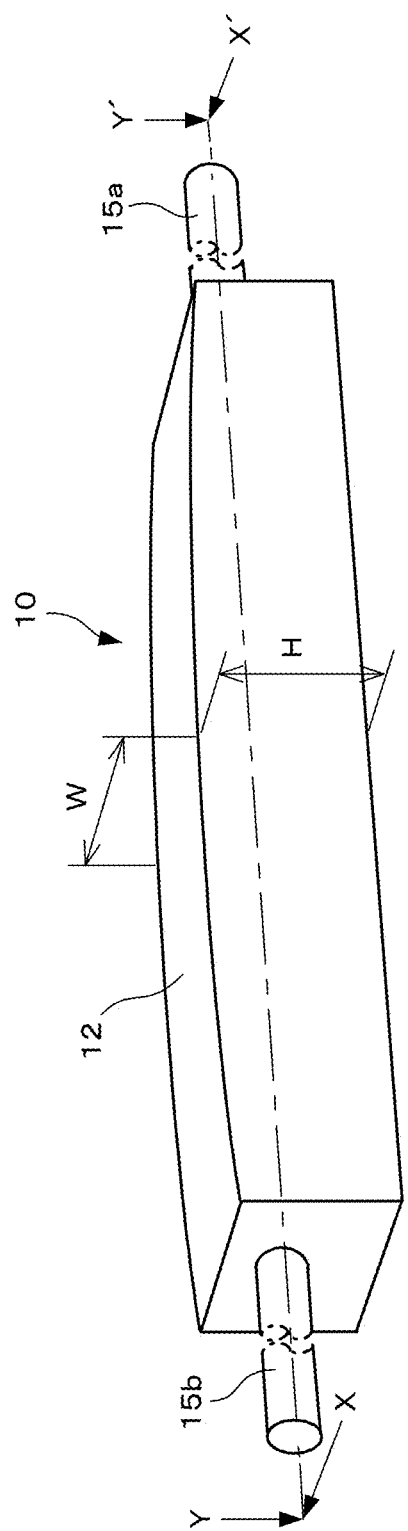
FIG. 1 is a diagram illustrating an external structure of a temperature sensor element according to an embodiment of the present invention.

An embodiment according to the present invention is described in detail below with reference to accompanying drawings. FIG. 1 illustrates an external structure of a temperature sensor element according to the embodiment of the present invention. Moreover, FIG. 2A is a vertical cross-section of the temperature sensor element of FIG. 1 cut along a line Y-Y' indicated by arrows, and FIG. 2B is a horizontal cross-section of the temperature sensor element cut along a line X-X' indicated by arrows.

As illustrated in FIG. 1, a temperature sensor element 10 according to the embodiment includes an element main body 12 and lead wires 15a and 15b, which are led from either end of the element main body 12 along the length thereof. The temperature sensor element 10 has an overall square-columnar shape (prismatic bar) without any irregularities on the outer surface, and the shape of the cross-section (vertical cross-sectional shape or transverse cross-sectional shape) orthogonal to the length of the element is approximately square even at any location along the length of the element.

Figure 2A:
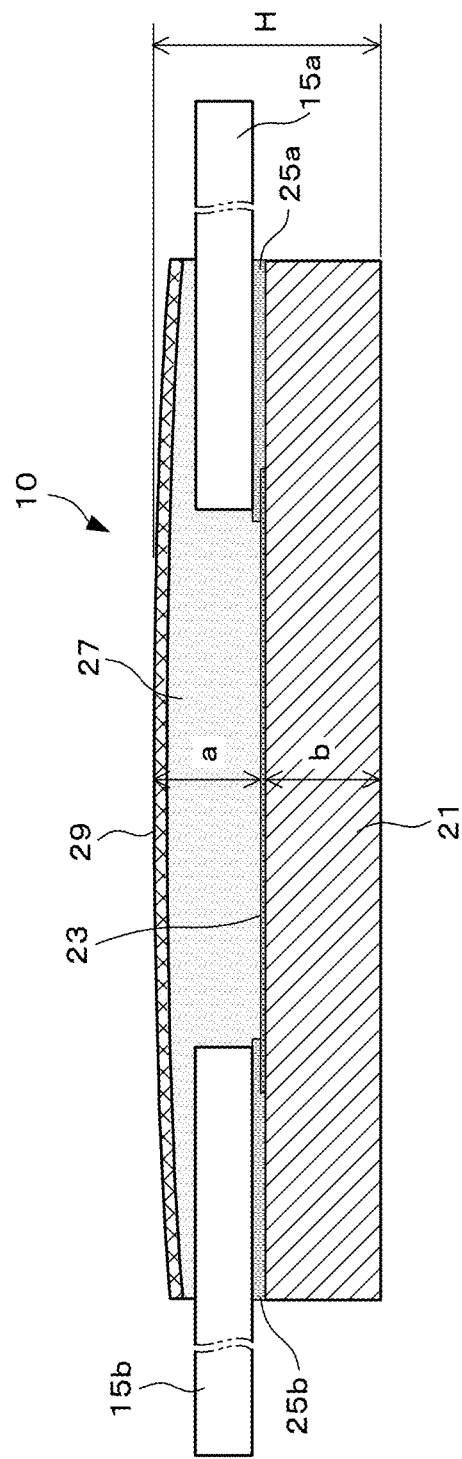
FIG. 2A is a vertical cross-section illustrating a structure of the temperature sensor element according to the embodiment.
Figure 2B:
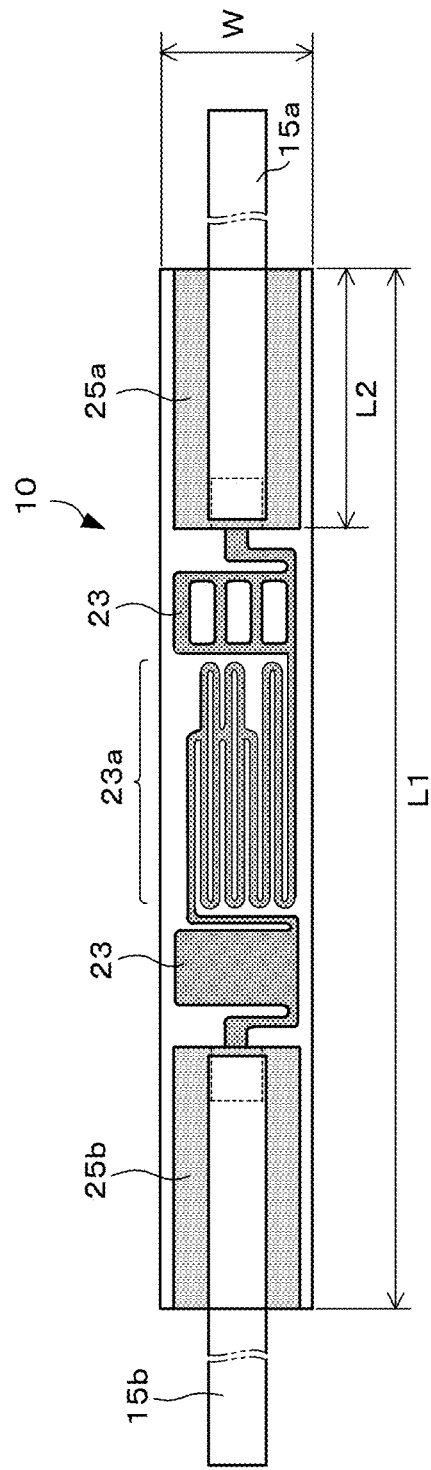
FIG. 2B is a horizontal cross-section illustrating a structure of the temperature sensor element.

In the temperature sensor element 10 illustrated in FIG. 2A and FIG. 2B, internal electrodes (also referred to as electrode pads) 25a and 25b having a predetermined thickness are formed on either top end of a substrate 21 that has a planar rectangular shape, and a resistance film 23 made in a predetermined pattern is formed between the internal electrodes 25a and 25b. Moreover, ends of the lead wires 15a and 15b are connected to the internal electrodes 25a and 25b, respectively, by welding or the like.

A protective film 27 is formed on the top side of the substrate 21 so as to cover the internal electrodes 25a and 25b, the resistance film 23, and the top surfaces of joined regions of the lead wires 15a and 15b connected to the internal electrodes 25a and 25b, and a surface layer protective film 29 is formed covering the entire protective film 27. These protective films are also referred to as protective films 27 and 29 hereafter.

The substrate 21 is made of an electric insulating ceramic substrate or an alumina substrate ($Al_2O_3$), etc. having a thickness of approximately 0.3 mm, for example. The resistance film 23 formed on a top surface of the substrate 21 is a thin resistance film (platinum resistance film pattern) made of platinum (Pt), and resistance thereof is 20Ω, for example. The internal electrodes 25a and 25b are printed using an electrode paste containing platinum or the like, for example. The lead wires 15a and 15b are platinum-covered nickel core wires having a diameter of 0.15 mm, for example. Moreover, the protective films 27 and 29 are made of heat-resistant glass, for example, having a small difference in linear expansion coefficient from the substrate. Note that platinum has excellent stability and linearity, and allows measurement of temperature with high accuracy over a large temperature range.

The temperature sensor element 10 according to the embodiment is a self-heating element using a platinum hot wire (a platinum heating coil). The center part of the resistance film 23, as illustrated in FIG. 2B, is a heating part 23a made of a meander-shaped pattern that self-heats once an electric current is applied. The heating part 23a is positioned nearly at the center in the longitudinal direction and the width direction of the substrate 21 when viewed from above, and is positioned nearly at the center even along the thickness (height) of the temperature sensor element 10 since it is between the substrate 21 and the protective films 27 and 29.

Since the heating part 23a of the temperature sensor element 10 is positioned at nearly the center of the resistance film pattern and at nearly the center of the height and width directions of the sensor element, the vicinity of the center of the temperature sensor element is a heat-generating point. That is, since provision of a heat-generating configuration at the center of the temperature sensor element rids deviation of heat generation and makes heat release to the lead wires 15a and 15b constant and stabilized, there is an advantage that adjustment of heat release can be reduced to a minimum (only a small span of adjustable range is necessary.)

Note that if the heat-generating point of the self-heating temperature sensor element is positioned away from the vicinity of the center of the element, heat release to the lead wires changes and is not constant, and thus the necessary electric current for heating the heating part also changes. Therefore, a countermeasure against fluctuation (adjustment of measuring circuit etc.) in air flow measurements due to such fluctuation of generated heat, heat release, etc. is necessary.

<External Dimensions of Temperature Sensor Element>

Next, dimensions of each part of the temperature sensor element 10 according to the embodiment is described. The longitudinal cross-sectional shape of the temperature sensor element 10 has the thickest part of the protective films 27 and 29 at the center along the length of the element, decreasing slightly as it approaches an end (lead wire side), as illustrated in FIG. 2A. The cross-sectional shape at the center along the length of the temperature sensor element 10 is approximately square, and is nearly rectangular on end sides (lead wire sides). The temperature sensor element 10 has length L1 (the length of the substrate 21 in the longitudinal direction) of 2 mm, for example, height H at the center along the length of 0.6 mm, for example, and width W (also width of the substrate 21) of 0.4 mm, for example. Moreover, thickness 'a' of the protective films 27 and 29 at the center along the length of the element is 0.35 mm, for example, and thicknesses on top of the lead wires 15a and 15b are 130 to 180 μm, for example.

In this manner, the temperature sensor element 10 has an overall square-columnar shape (prismatic bar) formed by the protective films making the top surfaces of joined regions of the lead wires 15a and 15b connected to the internal electrodes 25a and 25b have a fixed thickness, and shape of the transverse cross-section of the element is approximately square even at any portion along the length, as described above. However, shape of the transverse cross-section at the center along the length of the element is closer to a square than the shape of the end surface along the length thereof.

Of the temperature sensor element 10 according to the embodiment, since thickness a (e.g., 0.35 mm) of the protective films 27 and 29 and thickness b (e.g., 0.3 mm) of the substrate 21 are approximately equal (a≈b), ratio of thickness b of the substrate 21 to thickness a of the protective films 27 and 29 is nearly 1:1. Moreover, ratio of width W to height H of the element is 1:1 to 1.5, including height H of 0.6 mm and width W of 0.4 mm, as described above.

Ratio of width of the substrate 21 of the temperature sensor element 10 to wire diameter of the lead wires 15a and 15b is 2.5:1 to 3:1, and ratio of length L1 of the substrate 21 along the length thereof to length L2 of the internal electrodes 25a and 25b along the length of the element is 1:4 to 1:5 (see FIG. 2B). Balancing the dimensional ratios between the respective parts in the entire structure of the temperature sensor element 10 in this manner will be a countermeasure against turbulence of air flow, release of generated heat, etc.

Moreover, since reduction of the thickness and width of the substrate 21 allows miniaturization of the temperature sensor element 10 so as to reduce heat capacity, thermal response as a temperature sensor becomes quicker. Furthermore, provision of the protective films 27 and 29 on top of the lead wires 15a and 15b allows not only a square-columnar external shape of the overall temperature sensor element but also a fixing effect on the substrate 21 of the lead wires 15a and 15b.

<Relationship Between Shape and Temperature Detection of Temperature Sensor Element>

Next, relationship between cross-sectional shape and fluctuation in detected temperatures when focused on the cross-sectional shape of a temperature sensor element having an overall columnar shape is described in detail. The temperature sensor element 10 according to the embodiment is a hot type element. Since current flows through the resistive film 23 that is made of a platinum pattern formed on the surface of the substrate 21 constituting the sensor element 10 so as to increase temperature through self-heating, and the element is exposed to an air flow, the element utilizes change in resistance through loss of the heat generated at the resistive film. Moreover, heat lost due to air flow is detected electrically based on the change in resistance of the platinum pattern, and thereby measuring air flow rate in an environment where the temperature sensor element is installed.

Figure 3A:
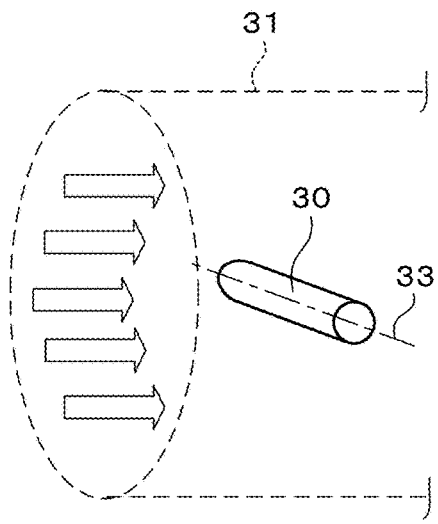
FIG. 3A illustrates a sensor element having a round cross-section.

FIG. 3 illustrates a sensor element installed within an air duct, wherein a sensor element 30 within an air duct 31 as shown in FIG. 3A has a round cross-section, and thereby even if it rotates around an axis 33, the projected area of the sensor element 30 when viewed from an air flow direction indicated by arrows in the drawing does not change. Therefore, even if the sensor element 30 rotates around the axis, the air flow does not change due to the change in the cross-sectional shape of the sensor element 30 owing to the rotation, and turbulence of air flow such as stagnating air or the like around the element does not occur.

On the other hand, a sensor element 40 of FIG. 3B has a rectangular cross-section, and thus when it rotates around an axis 43 within the air duct 31, the projected area of the sensor element 40 when viewed from the air flow direction changes, as described later. Accordingly, such a change as change in even the area that stems air occurs, and there are places where the air flow stagnates around the sensor element 40.

Figure 3B:
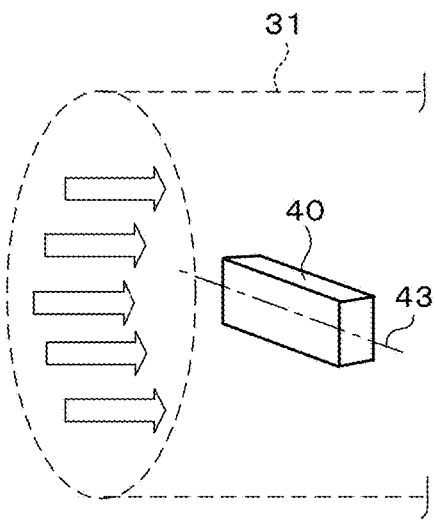
FIG. 3B illustrates a sensor element having a rectangular cross-section.
Figure 4:
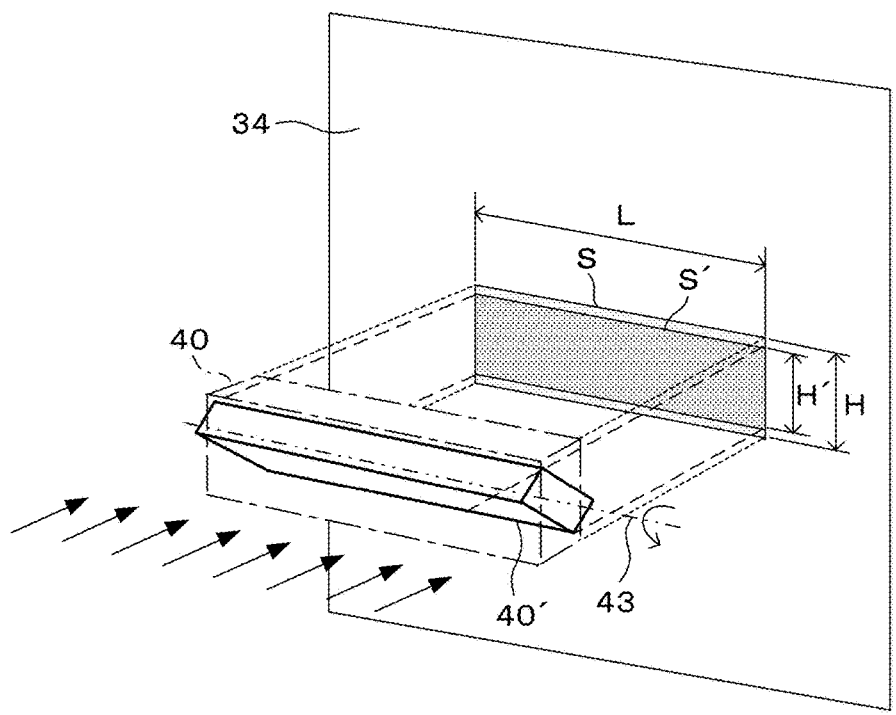
FIG. 4 is a diagram schematically illustrating change in projected area due to axial rotation of the sensor element.

FIG. 4 schematically illustrates change in projected area due to axial rotation of the sensor element 40 shown in FIG. 3B. A projected area denotes area of the shadow of the three-dimensional body (sensor elements 40 and 40' here) on which parallel lights indicated by arrows are irradiated on the front surface of the body and projected on a virtual screen 34 that is provided vertically on the opposite side. The sensor element 40 indicated by a chain line in FIG. 4 is not rotating (not tilted) around the axis, wherein a projected area S on the virtual screen 34 is: S=height H×length L.

Moreover, the sensor element 40' indicated by a solid line in FIG. 4 is rotating around the axis 43 at a predetermined angle, wherein a projected area S' is: S'=height H'×length L. Since H>H' in the example of FIG. 4, projected area S>projected area S'.

Figure 5:
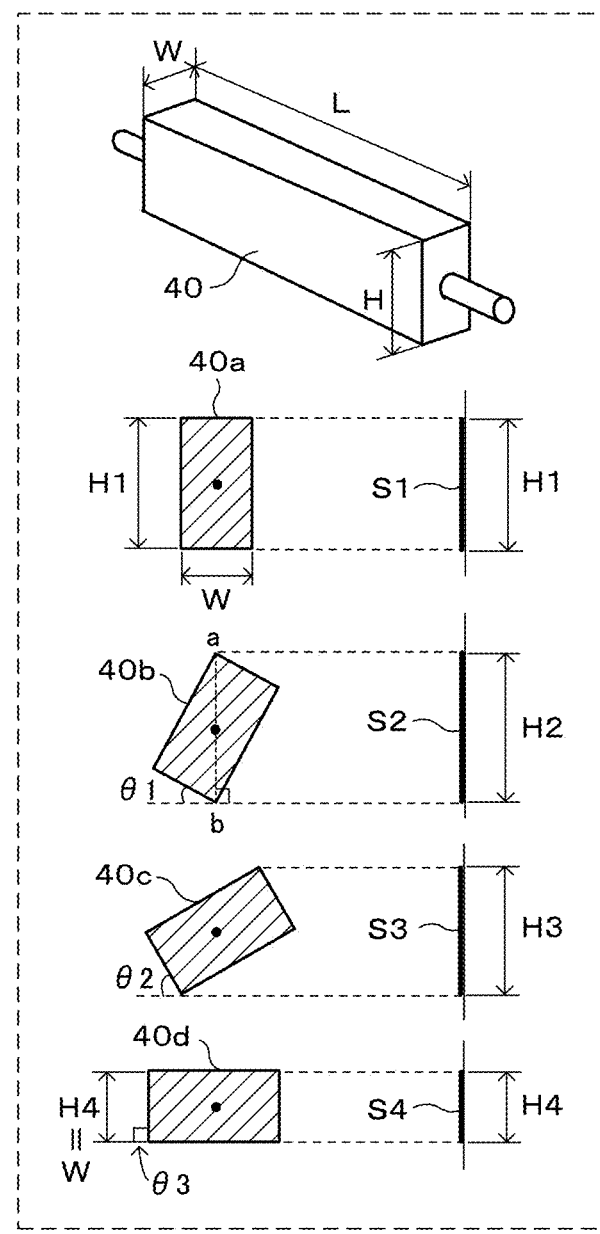
FIG. 5 is a diagram illustrating change in rotational angle and change in projected area of the sensor element having a rectangular transverse cross-section when the element is rotated around its axis.
Figure 6:
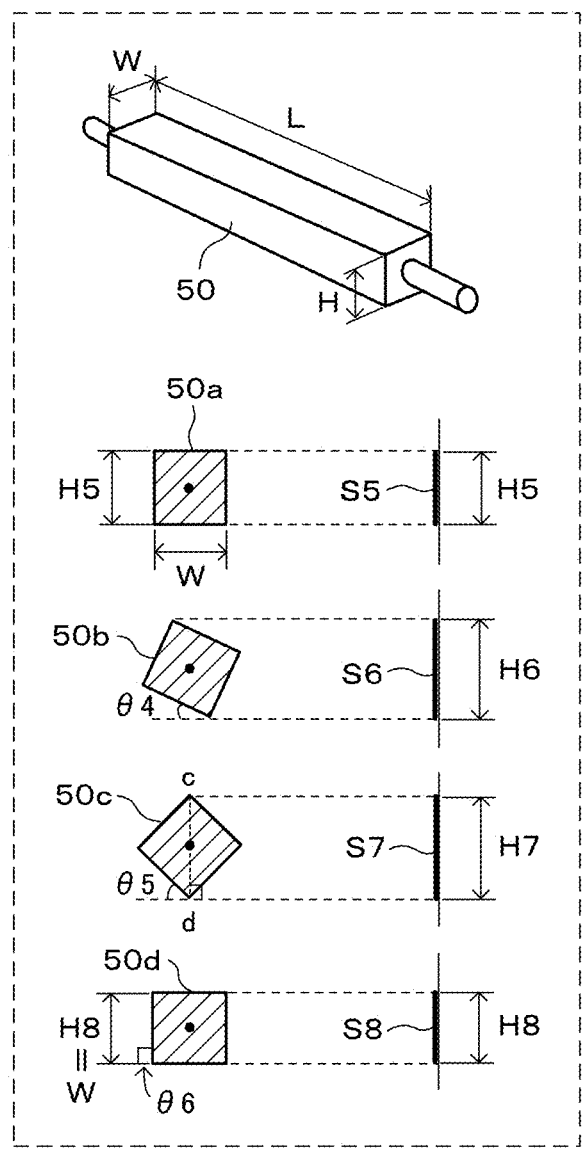
FIG. 6 is a diagram illustrating change in rotational angle and change in projected area of the sensor element having a square transverse cross-section when the element is rotated around its axis.

FIG. 5 and FIG. 6 illustrate change in rotational angle and change in projected area of a sensor when viewed from the axial direction, respectively, where the sensor element 40 having a rectangular transverse cross-section and the sensor element 50 having a square transverse cross-section are rotated around an axis. Note that since the sensor elements 40 and 50 have the same axial length L, change in vertical height H can be considered as change in projected area.

FIG. 5 illustrates change in projected area when a mounting angle of the sensor element 40 is increased gradually from a non-tilted state (a sensor element 40a, where θ=0 degrees) to a tilt of 90 degrees (a sensor element 40d with a tilting angle of θ3). Since a sensor element 40b has the state where a tilting angle is θ1, and height is maximum (H2) when a diagonal line joining a and b in the drawing is vertical, a projected area S2 in this state is maximum, accordingly. As a result, in the example of FIG. 5, relationship of the projected areas is S2>S1>S3>S4 due to the height relationship H2>H1>H3>H4.

FIG. 6 illustrates changes in projected area when a mounting angle of the temperature sensor element according to the embodiment, that is, the sensor element 50 having an approximately square transverse cross-sectional shape is increased gradually from a non-tilted state (a sensor element 50a, where θ=0 degrees) to a tilt of 90 degrees (a sensor element 50d with a tilting angle of θ6), as in the case of FIG. 5. Since a sensor element 50c has the state where a tilting angle is θ5, and a diagonal line joining c and d in the drawing is vertical, height is maximum (H7), and projected area S7 is also maximum. Moreover, in the case of the sensor element 50, a relationship between the projected areas is S5=S8 due to the relationship of height: H5=H8. As a result, since the relationship between the heights is H7>H6>H5 (=H8) in the case of the sensor element 50 illustrated in FIG. 6, the relationship between the projected areas is S7>S6>S5 (=S8).

As such, the sensor element 40 having a rectangular cross-section is not in the relationship 1:1 of height H to thickness (width) W. Therefore, when the sensor element has rotated around the axis, height of the projected portion of the sensor changes greatly in accordance with the rotational angle (mounting angle). This means that the projected area changes greatly in accordance with axial rotation of the sensor element 40, and difference between the maximum and the minimum area (difference between S2 and S4 in the example of FIG. 5) is large.

Such large change in projected area due to change in mounting angle brings about change in air flow hitting the sensor element 40, thereby leading to turbulence of air flow. As a result, how heat is lost from the heating part of the sensor element 40 also changes, causing fluctuation in air flow measurement results by the sensor element 40 and decrease in measurement accuracy.

Meanwhile, in the case of the sensor element 50 having an approximately square transverse cross-sectional shape, the relationship of height H to thickness (width) W is 1:1, and thus there is no large change in the projected areas S5 to S8. More specifically, comparison of heights H5, H6, H7, and H8 shows little difference among them; where H5 denotes height of a projected portion when a sensor element 50a is in an non-tilted state without rotating around the axis, H6 denotes height of a projected portion when a sensor element 50b has rotated around the axis by a mere angle θ4, H7 denotes height of a projected portion when a sensor element 50c has rotated around the axis by a mere angle θ5, and H8 denotes height of a projected portion when a sensor element 50d has rotated around the axis by 90 degrees (θ6=90 degrees).

That is, the temperature sensor element according to the embodiment has a ratio of width (W) to height (H) is: W:H≈1:1 to 1.5 as described above. Note that the ratio may also be defined as: H:W≈1:1 to 1.5. Therefore, even if the mounting angle of the sensor changes, as illustrated in FIG. 6, the relationship in height of the projected portion is H5=H8≈H6≈H7. As a result, with the sensor element 50, there is little difference among the projected areas S5 to S8 when viewed from the inflow direction of the air, and there is little difference between the maximum and the minimum value of the projected areas even if the mounting angle of the sensor element changes.

Even if the shape of the transverse cross-section of the sensor element is quadrilateral (tetragon) in this manner, since there is a difference between height and width (length of long sides and short sides) in the case of a rectangular shape, there is a large change in projected area when the installation state (mounting angle) of the sensor element changes through rotation around the axis. In contrast, in the case of the sensor element having an approximately square cross-sectional shape, it is understood that there is no large change in the projected area even if the sensor element rotates around the axis since the height and the width of the cross section are nearly the same.

<Temperature Detection Simulation Using Sensor Element Samples>

Next, simulation of detecting element's temperature by changing the mounting angle of sensor element samples that have an overall prismatic-bar shape but different cross-sectional shapes is described.

Figure 7:
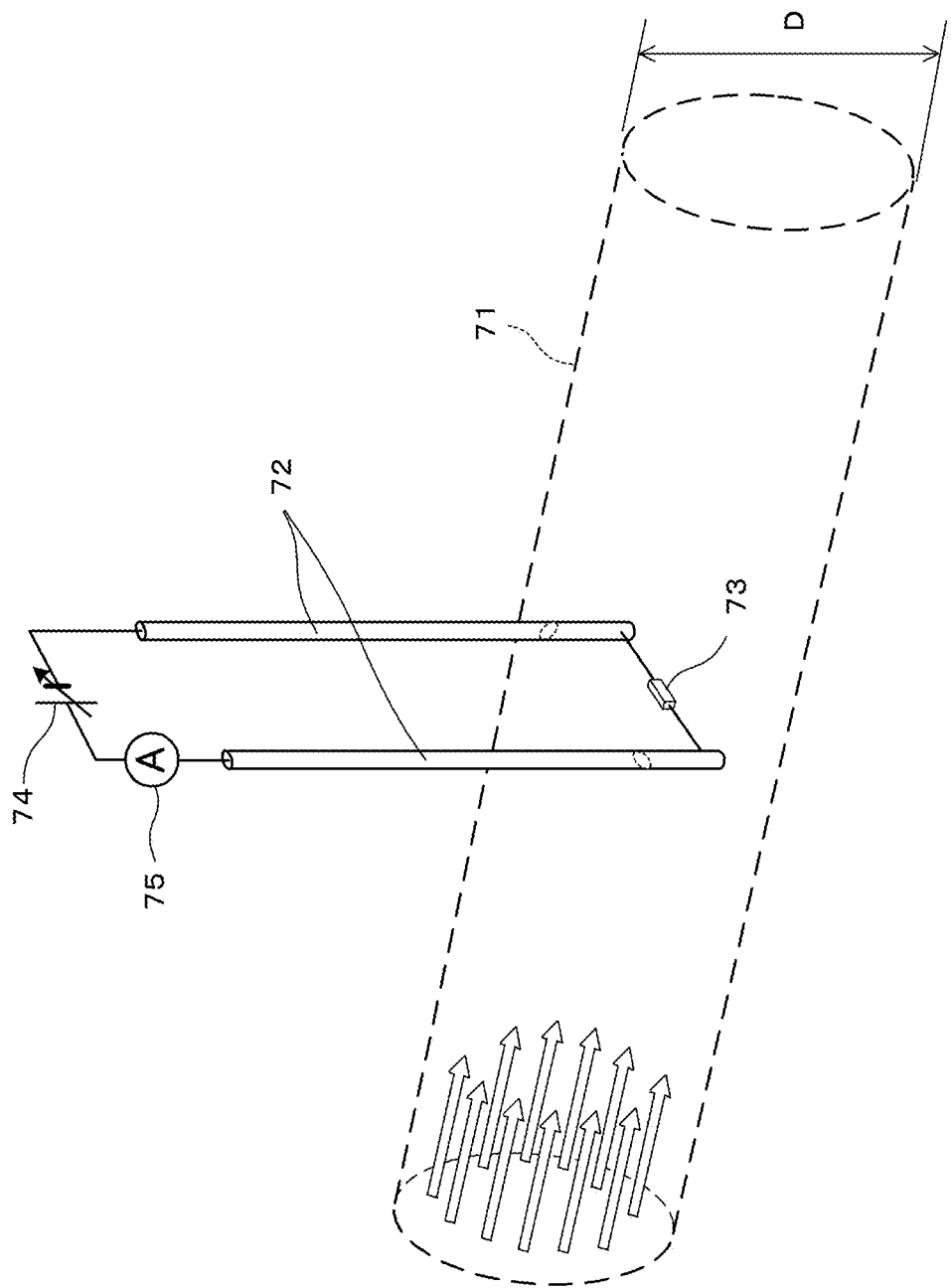
FIG. 7 is a diagram illustrating a configuration of a simulation device for detecting temperature using the temperature sensor element.

FIG. 7 illustrates a configuration of a simulation device for detecting temperature using a temperature sensor element as an air-flow sensor. Here, paired support columns 72 vertically piercing the length of an air duct 71 are provided, wherein the air duct 71 has a length enough to provide a predetermined airflow, a diameter D of 10 mm, for example, and a cylindrical shape. And a temperature sensor element 73 is mounted near ends of the support columns 72 inserted in the air duct 71 so as to bridge the gap between the support columns. The temperature sensor element 73 is installed such that its long axis is at a right angle to the air flow direction so as to be surely exposed to air flow (indicated by arrows in the drawing) within the air duct 71, and is positioned at the center of the air duct cross section.

Moreover, in order to supply power to the self-heating type temperature sensor element 73 from the outside, the support columns 72 are constituted by a conductive material such as metal, and a power source 74 for power supply and an ammeter 75 for detecting electric current flowing through the sensor element 73 are connected to the respective front ends of the support columns 72 opposite to the mounting side of the temperature sensor element 73. Note that a means (not shown in the drawing) for keeping the support columns 72 at a constant temperature of 25° C., for example, is provided so that the temperature of the support columns themselves does not influence measurement.

In the executed temperature detection simulation, 5 types of samples having a fixed element width W of 0.6 mm and height H of 0.22 to 1.0 mm with a quadrilateral (rectangle, square) cross-sectional shape are prepared. For each of the samples, element temperature in air flow within the air duct when the mounting angle θ to the air flow direction is changed to 0 degrees to 90 degrees is measured, so as to find difference between the maximum value and the minimum value of the measured temperatures.

Details of each sample are given below.

Sample 1: W×H=0.6 mm×0.2 mm (rectangular cross-section)
Sample 2: W×H=0.6 mm×0.4 mm (approximately square cross-section)
Sample 3: W×H=0.6 mm×0.6 mm (square cross-section)
Sample 4: W×H=0.6 mm×0.8 mm (approximately square cross-section)
Sample 5: W×H=0.6 mm×1.0 mm (rectangular cross-section)
Sample 6: W×H=cylindrical sensor element (round cross-section with a diameter of 0.6 mm)

In this simulation, air flow at a wind speed of 1.0/sec. hits the sample element in the direction orthogonal to the long axis of an element in the state where the sample element installed within the air duct 71 shown in FIG. 7 is heated to 0.322 W. Element temperature at a total of seven different mounting angles changed every 15 degrees within a range of 0 degrees to 90 degrees is then measured for the five types of samples 1 to 5 having the same element width W but different height H.

Figure 8:
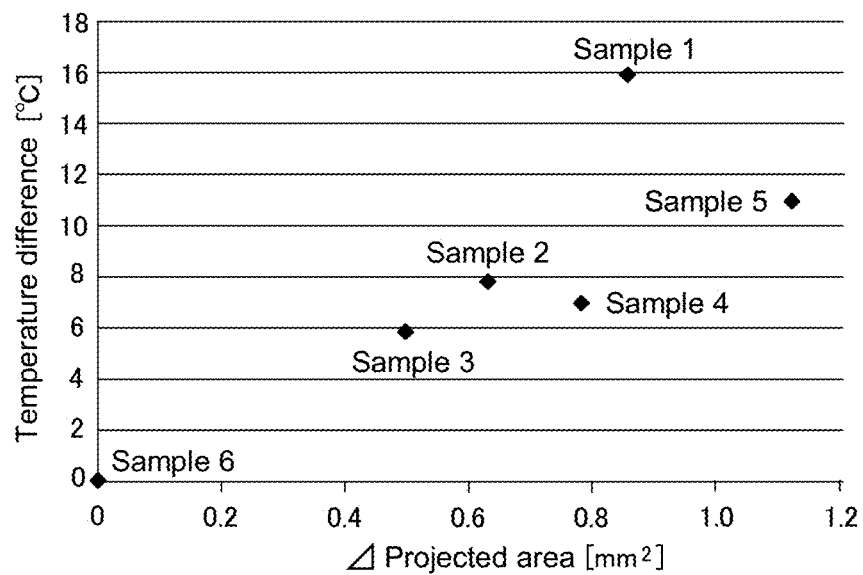
FIG. 8 is a graph plotting the results of the temperature detection simulation for samples.

FIG. 8 is a graph plotting results of the temperature detection simulation for samples 1 to 5, wherein the longitudinal axis gives difference between the maximum and the minimum element temperature of the sample elements at each of the mounting angles, and the horizontal axis gives difference between the maximum and the minimum projected area due to change in the mounting angle. Therefore, the horizontal axis gives the degree of change in projected area according to change in mounting angle for each sample.

Figure 9:
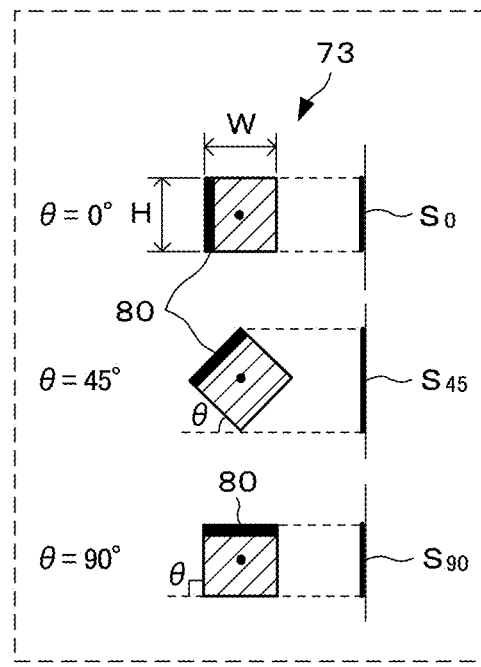
FIG. 9 is a diagram illustrating the samples used in the temperature detection simulation when viewed from the axial direction.

FIG. 9 exemplifies states of the temperature sensor element 73 (samples 1 to 5) used in the temperature detection simulation when viewed from the axial direction. FIG. 9 illustrates cases where the mounting angle is 0 degrees, 45 degrees, and 90 degrees, and the projected areas of the respective samples at those mounting angles are $S_0$, $S_{45}$, and $S_{90}$. Note that heating portions of the respective samples are indicated by a reference numeral 80.

It can be understood from the simulation results given in FIG. 8 when focusing on the transverse direction of the graph that samples 1 and 5 of the sensor element having a rectangular cross-sectional shape show greater change Δ in projected area according to change in mounting angle than sample 3 having a square cross-sectional shape, and samples 2 and 4 having an approximately square cross-sectional shape. Moreover, it can be understood when focusing on the longitudinal direction of the graph that the closer to a square the cross-sectional shape of the sensor element of the sample, the smaller the temperature difference due to mounting angle. Note that sample 6 having a round cross-sectional shape is plotted at the starting point because its temperature should not change without change in projected area even when axially rotating.

Accordingly, since the sample sensor element having a square cross-sectional shape or an approximately square cross-sectional shape is less influenced by change in the projected area due to change in mounting angle of the sensor element than the sample sensor element having a rectangular cross-sectional shape, and has smaller temperature difference, it has less influence on the characteristics of an air-flow sensor, such as temperature sensor characteristics in airflow measurement. In other words, in the simulation results given in FIG. 8, sample 3 having a square cross-sectional shape has closer characteristics to sample 6 having a round cross-section since sample 3 has a shorter plotted distance to sample 6. Moreover, since the smaller the temperature difference of the sensor element as with samples 2 to 4, the less current difference necessary for heating the sensor element, the sensor can be downsized.

As described above, since the temperature sensor element according to the embodiment is given an overall square-columnar shape (quadrangular prism shape) and such a structure as the shape of the transverse cross-section is approximately square even at any portion in the axial direction, it can be downsized so as to reduce heat capacity more than the temperature sensor having a rectangular transverse cross-sectional shape, and thereby allowing implementation of a temperature sensor having a quicker thermal response.

Furthermore, since the shape of the transverse cross-section of the sensor element is approximately square without any irregularities on the outer surface, the projected area is kept nearly constant even if the sensor element is mounted in a state having rotated around the axis at a predetermined angle or it rotates around the axis after mounting and thereby changing the mounting angle. Moreover, since turbulence of air flow hitting the sensor does not occur, heat release from the heating part of the sensor does not fluctuate. As a result, there is no fluctuation in resistance due to turbulence of air flow hitting the sensor, and thus there is no fluctuation in the temperature measurement results, which allows prevention of adverse influence on temperature detection due to turbulence of the air flow and thus allows accurate measurement of the air flow rate.

Yet further, the heating part of the self-heating type temperature sensor element is positioned nearly at the center in the length, thickness, and width directions of the element so as to make the vicinity of the center of the element a heat-generating point. This allows stable release of the heat generated by the heating part to lead wires, thereby providing a stable temperature sensor element having a small adjustment width for temperature correction. The heating part is not exposed from the element, and is thus not influenced by pollution caused by measurement atmosphere.

DESCRIPTION OF REFERENCE NUMERALS 10, 73: Temperature sensor element
12: Element main body
15a, 15b: Lead wire
21: Substrate
23: Resistance film
23a: Heating part
25a, 25b: Internal electrode
27: Protective film
29: Surface layer protective film
30, 40, 40', 50: Sensor element
31, 71: Air duct
33, 43: Axis
34: Virtual screen
72: Support column
74: Power source
75: Ammeter
80: Heating part

What is claimed:

1. A platinum temperature sensor element comprising:
an insulating substrate having a planar rectangular shape made of an insulating material with a predetermined thickness;
a pattern made of a platinum resistance film formed on the insulating material;
a pair of electrodes formed on either end along a length of the insulating substrate;
lead wires that are joined to the respective paired electrodes and extend to an outside of the platinum temperature sensor element; and
a protective film that is formed on a top side of the insulating substrate to cover the pattern, the paired electrodes, and top surfaces of joined regions of the lead wires to the paired electrodes;
wherein the platinum temperature sensor element has an overall shape of a square column, and a transverse cross-sectional shape at a center along the length is quadrilateral where a ratio of length and breadth is 1:1 to 1.5; and wherein at the center along the length, a ratio between thickness of the insulating substrate and thickness of the protective film is approximately equal to 1.

2. The platinum temperature sensor element of claim 1, wherein the center of the pattern is a heating part, and the heating part is positioned at nearly the center along the length of the insulating substrate and also at nearly the center along the height and the width of the platinum temperature sensor element.

3. The platinum temperature sensor element of claim 2, wherein the heating part is made of a meander-shaped pattern.

4. The platinum temperature sensor element of claim 1, wherein a thickness of the protective film on top of the joined regions is 130 to 180 μm.

5. The platinum temperature sensor element of claim 1, wherein a ratio of width of the insulating substrate to height of the platinum temperature sensor element is 1:1 to 1.5, a ratio of width of the insulating substrate to diameter of the lead wires is 2.5:1 to 3:1, and a ratio of respective length of the paired electrodes to length of the insulating substrate is 1:4 to 1.5.

* * * * *